(12) United States Patent
Ryoo

(10) Patent No.: US 8,022,574 B2
(45) Date of Patent: Sep. 20, 2011

(54) MAXIMUM VOLTAGE SOURCE SELECTOR

(75) Inventor: Ji-Yeoul Ryoo, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 395 days.

(21) Appl. No.: 12/276,706

(22) Filed: Nov. 24, 2008

(65) Prior Publication Data

US 2009/0134708 A1    May 28, 2009

(30) Foreign Application Priority Data

Nov. 26, 2007   (KR) .................. 10-2007-0121023

(51) Int. Cl.
*H02J 1/00* (2006.01)
(52) U.S. Cl. ........................................................ 307/80
(58) Field of Classification Search ...................... 307/80
See application file for complete search history.

(56) References Cited

U.S. PATENT DOCUMENTS 7,215,043 B2 * 5/2007 Tsai et al. .................... 307/130
2002/0121887 A1   9/2002 Inatomi et al.
2004/0217653 A1 * 11/2004 Neidorff ........................ 307/80

FOREIGN PATENT DOCUMENTS

JP        2005045942 A    2/2005
KR    1020070032926 A    3/2007

* cited by examiner

*Primary Examiner* — Rexford Barnie
*Assistant Examiner* — Hal Kaplan
(74) *Attorney, Agent, or Firm* — Volentine & Whitt, PLLC

(57) ABSTRACT

A maximum voltage source selector adapted for use in a semiconductor device operative in a disable state or an enable state is disclosed. The maximum voltage source selector includes an output unit having an output node providing a maximum voltage selected from a first input voltage and a second input voltage. First and second gate transistors are commonly coupled to the output node and are respectively configured to select and provide the greater of the first and second input voltages to the output node in response to first and second selection signals without regard to whether the semiconductor device is in the disable state or the enable state. A selection unit generates the first and second selection signals in response to the first and second input voltages.

7 Claims, 1 Drawing Sheet

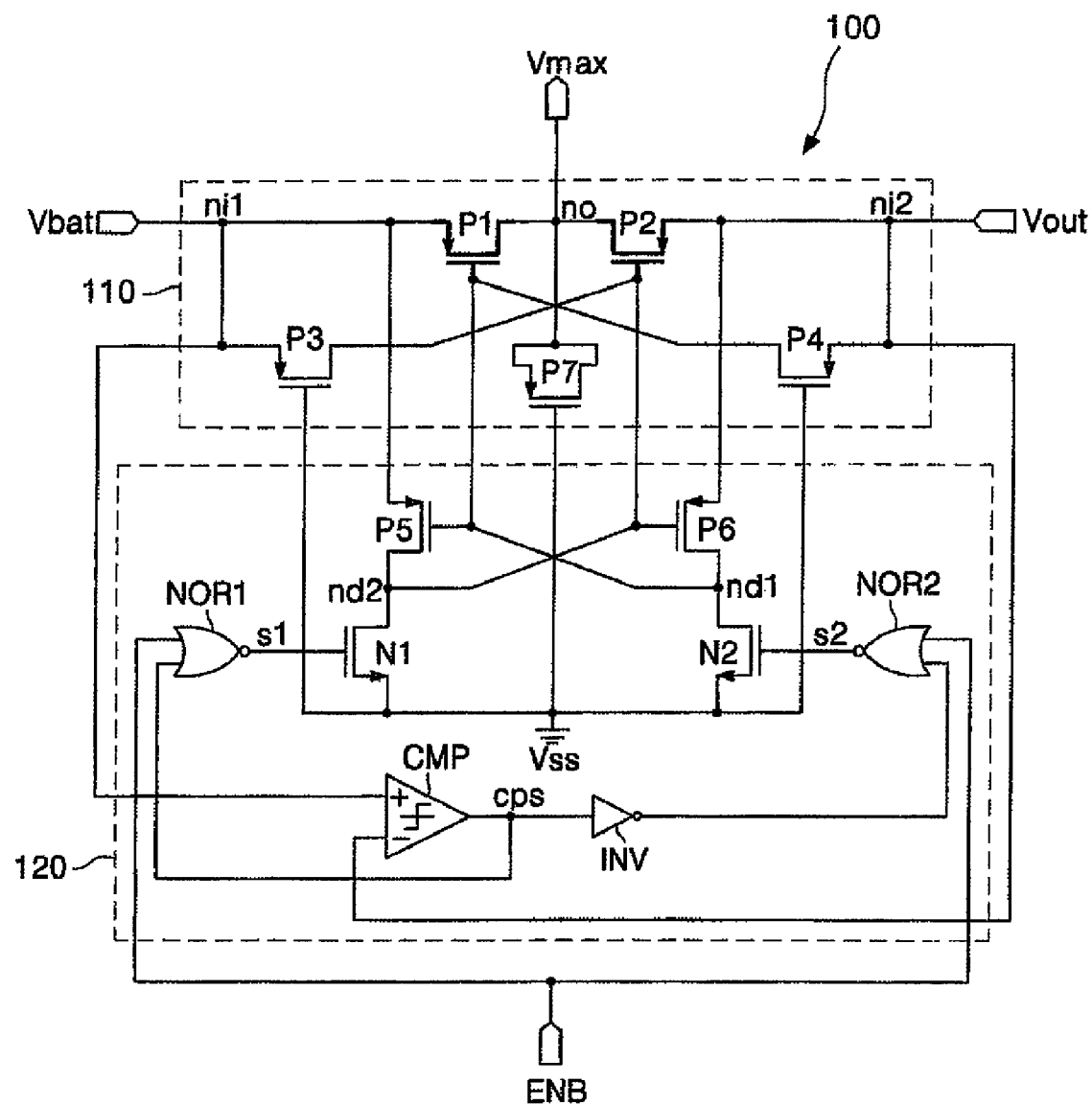

US 8,022,574 B2

MAXIMUM VOLTAGE SOURCE SELECTOR

CROSS-REFERENCE TO RELATED APPLICATION

This application claims the benefit of Korean Patent Application No. 10-2007-0121023 filed Nov. 26, 2007, the subject matter of which is hereby incorporated by reference.

BACKGROUND

The present invention relates to electrical circuitry and more particularly a class of circuitry known as a maximum voltage source selector.

Many semiconductor devices require voltage source selectors to select and output one of multiple input voltages. Among the more general class of voltage source selectors, a maximum voltage source selector is a circuit that selects a high power supply voltage among a plurality of power supply voltages to ensure stable operation of the constituent semiconductor device. For example, a maximum voltage source selector may be used to stably operate a power supply gate of a voltage boost circuit, such as a DC-DC converter.

A maximum voltage source selector is commonly used in semiconductor devices incorporated within portable electronic devices. Thus, the maximum voltage source selector enables the semiconductor device to stably operate by selecting the higher power supply voltage between an externally provided power supply voltage and, for example, a battery power supply voltage. For ease of reference and consistent with conventional use, the higher power supply voltage provided by the maximum voltage source selector, however derived, will be referred to as a "maximum voltage" without any intent to somehow suggest a conceptual or mathematical maximum for the signal or the plurality of signals from which the maximum voltage is selected.

Conventional maximum voltage source selectors select and output a maximum voltage through a different power voltage signal path depending on whether the incorporating semiconductor device is in an enable or disable state. Unfortunately, this use of alternate power voltage signal paths increased the overall area occupied by the maximum voltage source selector.

SUMMARY

Embodiments of the invention provide a maximum voltage source selector having a reduced size. In certain embodiment, this overall size reduction is reduced by reducing the number of gate transistors used to output the maximum voltage. In certain embodiments, this reduced number of gate transistors are used to output the maximum voltage regardless of the operating state (e.g., enabled/disabled) of the incorporating semiconductor device.

According to one embodiment, a maximum voltage source selector adapted for use in a semiconductor device operative in a disable state or an enable state includes; an output unit having an output node providing a maximum voltage selected from a first input voltage and a second input voltage. First and second gate transistors are commonly coupled to the output node and are respectively configured to select and provide the greater of the first and second input voltages to the output node in response to first and second selection signals without regard to whether the semiconductor device is in the disable state or the enable state. A selection unit generates the first and second selection signals in response to the first and second input voltages.

BRIEF DESCRIPTION OF THE DRAWINGS

The accompanying figure is a circuit diagram of a maximum voltage source selector according to one exemplary embodiment of the invention.

DETAILED DESCRIPTION OF THE EMBODIMENTS

Various embodiments will now be described more fully with reference to the accompanying drawings.

As noted above, the accompanying figure is a circuit diagram of a maximum voltage source selector according to one exemplary embodiment of the invention. The maximum voltage source selector 100 generally includes an output unit 110 configured to output a maximum voltage Vmax, regardless of the operating state (e.g., enable/disable) of the incorporating semiconductor device, and a selection unit 120 configured to select the maximum voltage Vmax when the semiconductor device is in the enable state.

In the illustrated embodiment, output unit 110 comprises first and second gate transistors P1 and P2 (e.g., relatively large PMOS transistors) adapted to output the maximum voltage Vmax to an output node (no) and smoothly supply the output node (no) with electrical current. The first gate transistor P1 is connected between a first input node (ni1)) and the output node (no) and has a gate connected to a first node (nd1). The second gate transistor P2 is connected between a second input node (ni2) and the output node (no) and has a gate connected to a second node nd2. The first and second gate transistors P1 and P2 are configured to output the maximum voltage Vmax to the output node regardless of whether the semiconductor device is in the enable state or disable state.

First and second resistance transistors P3 and P4 are PMOS transistors having a relatively narrow channel width, but a relatively long channel length. Such transistors are commonly used as resistive elements within semiconductor devices. The first resistance transistor P3 is connected between the first input node and the second node and has a gate connected to a ground voltage Vss and is therefore maintained in a constant ON state. Likewise, the second resistance transistor P4 is connected between the second input node and the first node and has a gate connected to the ground voltage Vss, and is similarly maintaining in a constant ON state. When the semiconductor device is in the disable state, the first resistance transistor P3 applies a first input voltage Vbat to the gate of the second gate transistor P2, and the resistance transistor P4 applies a second input voltage Vout to a gate of the first gate transistor P1.

In the illustrated embodiment, a output capacitance transistor P7 acts as a power supply capacitor to stabilize the maximum voltage Vmax output from the first and second gate transistors P1 and P2. In the particular configuration shown in the accompanying figure, the output capacitance transistor P7 has a gate connected to the ground voltage Vss and commonly coupled source and drain, and is therefore maintained in a constant ON state.

Selection unit 120 may be conceptually divided into a comparison unit and an amplification unit. The comparison unit in the illustrated embodiment includes a comparator (CMP) outputting a comparison signal (cps) upon comparing the first and second input voltages Vbat and Vout. The comparison unit also includes a first NOR gate (NOR1) providing a first selection signal (s1) after performing a NOR operation on an inverted enable signal (ENB) and the comparison signal. An inverter (INV) logically inverts the comparison signal before applying it to a second NOR gate (NOR2). The second NOR gate provides a second selection signal (s2) after performing a NOR operation on the inverted comparison signal and the inverted enable signal ENB.

The comparator within the comparison unit compares the first input voltage Vbat applied through the first input node with the second input voltage Vout applied through the second input node and outputs a high-level comparison signal when the first input voltage Vbat is higher than the second input voltage Vout, or a low-level comparison signal when the first input voltage Vbat is lower than the second input voltage Vout.

The amplification unit of selection unit 120 in the illustrated embodiment includes first and second PMOS transistors P5 and P6 and first and second NMOS transistors N1 and N2. First NMOS transistor N1 is connected between the second node and the ground voltage Vss and has a gate receiving the first selection signal. Second NMOS transistor N2 is connected between the first node and the ground voltage Vss and has a gate receiving the second selection signal. Within this configuration, the first and second NMOS transistors N1 and N2 generate a voltage difference between the first and second nodes in response to the first and second selection signals.

First PMOS transistor P5 is connected between the first input node and the second node and has a gate connected to the first node. Second PMOS transistor P6 is connected between the second input node and the first node and has a gate connected to the second node. Within this configuration, first and second PMOS transistors P5 and P6 amplify the voltage difference between the first and second nodes.

Operation of the maximum voltage source selector according to embodiment illustrated in the accompanying figure will now be described.

It is first assumed that the constituent semiconductor device is in a disable state and that the first input voltage Vbat is higher than the second input voltage Vout. Since the semiconductor device is in the disable state, a logically "high" inverted enable signal ENB is applied. Thus, in the illustrated embodiment an "enable signal" indicating the disable/enable operating state of the semiconductor device is actually the logical inverse of such. However, this control signal selection is made in relation to the specific example being described. Other "enable signals" may be defined within other embodiments.

Since the inverted enable signal ENB is high, the first and second NOR gates NOR1 and NOR2 of the comparison unit output logically "low" first and second selection signals, regardless of the actual level of the comparison signal. First and second NMOS transistors N1 and N2 are turned OFF in response to the low first and second selection signals.

However, first and second resistance transistors P3 and P4 have gates connected to the ground voltage Vss and therefore remain in a constant ON state. Thus, first and second resistance transistors P3 and P4 operate as resistors having relatively large resistances. When the first input voltage Vbat is higher than the second input voltage, the voltage level at the first node may be lower than the voltage level at the second node. Accordingly, first gate transistor P1 and first PMOS transistor P5 may be turned ON and second gate transistor P2 and second PMOS transistor P6 may be turned OFF. Consequently, the first input voltage Vbat is selected and output as the maximum voltage Vmax at the output node through first gate transistor P1. Under these conditions, since first PMOS transistor P5 may be turned ON but the first and second NMOS transistors N1 and N2 are turned OFF, the selection and output of the maximum voltage Vmax may not be affected.

When the semiconductor device is in the disable state and the first input voltage Vbat is less than the second input voltage Vout, the inverted enable signal ENB is high. Accordingly, the first and second NMOS transistors N1 and N2 are turned OFF in response to the low first and second selection signals. Since the first input voltage Vbat is lower than the second input voltage Vout, the voltage apparent at the second node through the first resistance transistor P3 may be lower than the voltage applied to the first node through the second resistance transistor P4. Accordingly, the second gate transistor P2 and the second PMOS transistor P6 are turned ON, and the first gate transistor P1 and the first PMOS transistor P5 are turned OFF. Consequently, the second input voltage Vout may be output as the maximum voltage Vmax to the output node through the second gate transistor P2.

When the semiconductor device is in the enable state and the first input voltage Vbat is higher than the second input voltage Vout, the inverted enable signal ENB will be low. Since the first input voltage Vbat is higher than the second input voltage Vout, the comparator (CMP) output a high comparison signal. The first NOR gate (NOR1) outputs a low first selection signal to the first NMOS transistor N1 in response to the low inverted enable signal ENB and high comparison signal. The second NOR gate (NOR2) outputs a high second selection signal to the second NMOS transistor N2 in response to the low inverted enable signal ENB and comparison signal, as inverted by the inverter (INV).

The first NMOS transistor N1 is turned OFF in response to the first selection signal and the second NMOS transistor N2 is turned ON in response to the second selection signal. Since the second NMOS transistor N2 may be turned ON, the voltage level at the first node drops and the first gate transistor P1 and first PMOS transistor P5 are turned ON in response to the voltage level at the first node. On the other hand, since the first NMOS transistor N1 is turned OFF, the voltage level at the second node does not drop. Accordingly, the second gate transistor P2 and second PMOS transistor P6 are turned OFF. Due to a voltage difference corresponding to the first input voltage Vbat that now exists between the gate and source of the first gate transistor P1, the first gate transistor P1 will exhibit very low ON resistance.

Here, since the gates of the first and second resistance transistors P3 and P4 having large resistances are connected to the ground voltage Vss and are constantly turned ON, their influence on the voltage levels apparent at the first and second nodes and is small. That is, recognizing that a current path may be formed (e.g.,) between the second input voltage Vout and ground Vss through the second resistance transistor P4, the resistance of the second resistance transistor P4 should be very large to minimize any current potentially flowing through this path.

When the semiconductor device is in the enable state and the first input voltage Vbat is less than the second input voltage Vout, the inverted enable signal ENB will be low. Since the first input voltage Vbat is less than the second input voltage Vout, the comparator (CMP) output a low comparison signal. The first NOR gate (NOR1) output a high first selection signal to the first NMOS transistor N1 in response to the low inverted enable signal ENB and low comparison signal. The second NOR gate (NOR2) outputs a low second selection signal to the second NMOS transistor N2 in response to the low inverted enable signal ENB and comparison signal, as inverted by the inverter (INV).

First NMOS transistor N1 is turned ON in response to the first selection signal and the second NMOS transistor N2 is turned OFF in response to the second selection signal. Since the first NMOS transistor N1 is turned ON, the voltage level apparent at the second node drops and the second gate transistor P2 and second PMOS transistor P6 are turned ON in response to the voltage level at the second node. On the other hand, since the second NMOS transistor N2 is turned OFF, the voltage level apparent at the first node does not drop. Accordingly, the first gate transistor P1 and first PMOS transistor P5 are turned OFF. Due to a voltage difference corresponding to the second input voltage Vout between the gate and source of the second gate transistor P2, the second gate transistor P2 exhibits a very low ON resistance.

As similarly noted above, the effects of the current path potentially formed between the first input voltage Vbat and ground Vss through the second resistance transistor P3 can be minimized due to the very large resistance of the second resistance transistor.

As a consequence of the foregoing, a maximum voltage source selector according to an embodiment of the invention, such as the maximum voltage source selector described in relation to the accompanying figure may be configured to output a maximum voltage Vmax via a common output node through either one of two gate transistors P1 or P2, regardless of whether the semiconductor device is in the enable state or disable state. When the semiconductor device is in the enable state, the ON resistance of the selected gate transistor P1 or P2 is reduced by increasing a voltage difference between the gate and source of the gate transistor. As a result, sufficient current is able to flow when the semiconductor device requires increased current.

The maximum voltage source selector 100 according to the illustrated embodiment comprises only the two gate transistors P1 and P2, but this need not be the case. Indeed, other embodiments of the invention make include more that two gate transistors associated with more than two power supply voltages. It should also be noted that the choice of PMOS versus NMOS devices and corresponding assumptions of high and low control signals may be reversed as a matter of design choice.

While example embodiments have been disclosed herein, it should be understood that other variations may be possible. Such variations are not to be regarded as a departure from the scope of the present invention as defined by the following claims.

What is claimed is:

1. A maximum voltage source selector for a semiconductor device operative in a disable state or an enable state, the maximum voltage source selector comprising:
   an output unit comprising;
      an output node providing a maximum voltage selected from a first input voltage and a second input voltage,
      first and second gate transistors commonly coupled to the output node and respectively configured to select and provide the greater of the first and second input voltages to the output node in response to first and second selection signals, and without regard to whether the semiconductor device is in the disable state or the enable state,
      a first input node receiving the first input voltage and a second input node receiving the second input voltage, wherein the first gate transistor is connected between the first input node and the output node and the second gate transistor is connected between the second input node and the output node,
      a first resistance transistor providing a voltage proportional to the first input voltage to a gate of the second gate transistor, and
      a second resistance transistor providing a voltage proportional to the second input voltage to a gate of the first gate transistor; and
   a selection unit generating the first and second selection signals in response to the first and second input voltages.

2. The maximum voltage source selector of claim 1, wherein the output unit further comprises:
   an output capacitance transistor connected to the output node and operating as a power supply capacitor to stabilize the maximum voltage provided by either the first gate transistor or the second gate transistor.

3. The maximum voltage source selector of claim 1, wherein the selection unit comprises:
   a comparison unit configured to generate the first and second selection signals in response to an enable signal indicating whether the semiconductor device is in the disable state or the enable state, and the first and second input voltages; and
   an amplification unit configured to control the ON/OFF operation of the first and second gate transistors by amplifying a voltage difference between a first and second nodes in response to the first and second selection signals.

4. The maximum voltage source selector of claim 3, wherein the comparison unit comprises:
   a comparator generating a comparison signal upon comparing the first input voltage with the second input voltage;
   a first NOR gate generating the first selection signal in relation to the comparison signal and the enable signal; and
   a second NOR gate generating the second selection signal in relation to an inverted version of the comparison signal and the enable signal.

5. The maximum voltage source selector of claim 3, wherein the amplification unit comprises:
   a first PMOS transistor and a first NMOS transistor connected in series between the first input node and ground, wherein the gate of the first NOMS transistor receives the first selection signal and the gate of the first PMOS transistor is connected to the gate of the first gate transistor; and
   a second PMOS transistor and a second NMOS transistor connected in series between the second input node and ground, wherein the gate of the second NOMS transistor receives the second selection signal and the gate of the second PMOS transistor is connected to the gate of the second gate transistor.

6. The maximum voltage source selector of claim 5, wherein each one of the first and second resistance transistors provides a sufficiently large resistance to reduce current flow through current paths existing between the first node and ground and the second node and ground.

7. The maximum voltage source selector of claim 1, wherein the first and second gate transistors are respectively PMOS transistors capable of providing sufficient current via the output node to operate the semiconductor device.

* * * * *